(12) United States Patent
Fadel et al.

(10) Patent No.: US 6,967,779 B2
(45) Date of Patent: Nov. 22, 2005

(54) MICRO-LENS ARRAY WITH PRECISELY ALIGNED APERTURE MASK AND METHODS OF PRODUCING SAME

(75) Inventors: Edward Fadel, Durham, NC (US); Robert P. Freese, Chapel Hill, NC (US); David Reed, Chapel Hill, NC (US); Dale S. Walker, Houston, TX (US)

(73) Assignee: Bright View Technologies, Inc., Chapel Hill, NC (US)

( * ) Notice: Subject to any disclaimer, the term of this patent is extended or adjusted under 35 U.S.C. 154(b) by 0 days.

(21) Appl. No.: 10/452,238

(22) Filed: Jun. 3, 2003

(65) Prior Publication Data

US 2004/0017612 A1    Jan. 29, 2004

Related U.S. Application Data

(63) Continuation-in-part of application No. 10/120,785, filed on Apr. 12, 2002, now Pat. No. 6,788,460, which is a continuation-in-part of application No. 09/521,236, filed on Apr. 5, 2000, now Pat. No. 6,483,612, which is a continuation of application No. 09/060,906, filed on Apr. 15, 1998, now abandoned.

(51) Int. Cl.[7] ........................... G02B 27/10; G03F 1/00; G03C 5/00
(52) U.S. Cl. ........................... 359/619; 359/620; 430/5; 430/321
(58) Field of Search ............................... 359/619, 620; 430/5, 262, 269, 321, 396, 449, 946; 355/403

(56) References Cited

U.S. PATENT DOCUMENTS

| | | |
|---|---|---|
| 1,942,841 A | 1/1934 | Shimizu |
| 3,893,748 A | 7/1975 | De Palma et al. |
| 4,076,384 A | 2/1978 | Deml et al. |
| 4,083,626 A | 4/1978 | Miyahara et al. |
| 4,172,219 A | 10/1979 | Deml et al. |
| 4,268,118 A | 5/1981 | Palmquist et al. |
| 4,418,986 A | 12/1983 | Yata et al. |
| 4,490,010 A | 12/1984 | Honda et al. |
| 4,523,849 A | 6/1985 | Stone |
| 4,666,248 A | 5/1987 | van de Ven |
| 4,773,731 A | 9/1988 | Goldenberg et al. |
| 4,799,137 A | 1/1989 | Aho |
| 4,874,228 A | 10/1989 | Aho et al. |
| 4,961,642 A | 10/1990 | Ogino |
| 4,969,732 A | 11/1990 | Wright et al. |

(Continued)

FOREIGN PATENT DOCUMENTS

EP    0 488 590 A1    6/1992

(Continued)

OTHER PUBLICATIONS

J.C. Love et al., "Microscope Projection Photolithography for Rapid Prototyping of Masters with Micron Sized Features for Use in Soft Lithography," Langmuir 2001, vol. 17, pp. 6005-6012.

(Continued)

Primary Examiner—Ricky Mack
(74) Attorney, Agent, or Firm—Myers Bigel Sibley & Sajovec (57) ABSTRACT

A micro-lens array with a precisely aligned aperture mask, and a method of forming the same, is provided. The aperture mask is formed by projecting light onto a mask layer using each lenslet in the micro-lens array. The intensity of the light and the mask layer material are chosen so that the light forms apertures in the mask layer via a non-ablative process. The resulting apertures are automatically aligned with their respective lenslets.

75 Claims, 8 Drawing Sheets

U.S. PATENT DOCUMENTS

| | | | |
|---|---|---|---|
| 4,982,214 A | 1/1991 | Matsui | |
| 5,054,885 A | 10/1991 | Melby | |
| 5,122,905 A | 6/1992 | Wheatley et al. | |
| 5,122,906 A | 6/1992 | Wheatley | |
| 5,166,824 A | 11/1992 | Nishiguchi et al. | |
| 5,190,370 A | 3/1993 | Miller et al. | |
| 5,193,015 A | 3/1993 | Shanks | |
| 5,223,869 A | 6/1993 | Yanagi | |
| 5,333,072 A | 7/1994 | Willett | |
| 5,337,106 A | 8/1994 | Jutamulia et al. | |
| 5,337,179 A | 8/1994 | Hodges | |
| 5,381,309 A | 1/1995 | Borchardt | |
| 5,404,076 A | 4/1995 | Dolan et al. | |
| 5,442,482 A | 8/1995 | Johnson et al. | |
| 5,453,859 A | 9/1995 | Sannohe et al. | |
| 5,467,154 A | 11/1995 | Gale et al. | |
| 5,473,453 A | 12/1995 | Kurematsu | |
| 5,486,949 A | 1/1996 | Schrenk et al. | |
| 5,496,668 A | 3/1996 | Guckel et al. | |
| 5,504,391 A | 4/1996 | Turner et al. | |
| 5,557,343 A | 9/1996 | Yamagishi | |
| 5,563,738 A | 10/1996 | Vance | |
| 5,573,324 A | 11/1996 | De Vaan | |
| 5,606,220 A | 2/1997 | Dolan et al. | |
| 5,612,820 A | 3/1997 | Schrenk et al. | |
| 5,615,045 A | 3/1997 | Takuma et al. | |
| 5,626,800 A | 5/1997 | Williams et al. | |
| 5,642,226 A | 6/1997 | Rosenthal | |
| 5,644,431 A | 7/1997 | Magee | |
| 5,657,408 A | 8/1997 | Ferm et al. | |
| 5,661,531 A | 8/1997 | Greene et al. | |
| 5,666,176 A | 9/1997 | Kurematsu | |
| 5,670,842 A | 9/1997 | Dolan et al. | |
| 5,682,080 A | 10/1997 | Dolan et al. | |
| 5,686,793 A | 11/1997 | Turner et al. | |
| 5,688,064 A | 11/1997 | Shanks | |
| 5,692,820 A | 12/1997 | Gale et al. | |
| 5,694,246 A | 12/1997 | Aoyama et al. | |
| 5,695,895 A | 12/1997 | Johnson et al. | |
| 5,796,499 A | 8/1998 | Wenyon | |
| 5,801,794 A | 9/1998 | Lehureau et al. | |
| 5,870,224 A | 2/1999 | Saitoh et al. | |
| 5,877,874 A | 3/1999 | Rosenberg | |
| 5,877,893 A | 3/1999 | Kim | |
| 5,932,342 A | 8/1999 | Zeira et al. | |
| 5,933,276 A | 8/1999 | Magee | |
| 6,128,054 A * | 10/2000 | Schwarzenberger | 349/73 |
| 6,185,038 B1 | 2/2001 | Yamaguchi et al. | |
| 6,278,546 B1 | 8/2001 | Dubin et al. | |
| 6,301,051 B1 | 10/2001 | Sankur | |
| 6,317,263 B1 | 11/2001 | Moshrefzadeh et al. | |
| 6,335,828 B1 | 1/2002 | Hashimoto et al. | |
| 6,353,500 B1 | 3/2002 | Guigan et al. | |
| 6,410,213 B1 | 6/2002 | Raguin et al. | |
| 6,469,830 B1 | 10/2002 | Dubin et al. | |
| 6,552,848 B2 | 4/2003 | Kobayashi | |
| 6,590,605 B1 | 7/2003 | Eichenlaub | |
| 6,594,079 B1 | 7/2003 | Trott et al. | |
| 6,597,502 B2 | 7/2003 | Takahashi et al. | |
| 6,639,705 B2 | 10/2003 | Hira | |
| 6,700,702 B2 | 3/2004 | Sales | |
| 6,829,087 B2 | 12/2004 | Freese et al. | |
| 2002/0034014 A1 | 3/2002 | Gretton et al. | |
| 2002/0034710 A1 | 3/2002 | Morris et al. | |
| 2002/0145797 A1 | 10/2002 | Sales | |
| 2004/0004770 A1 | 1/2004 | Ebina et al. | |

FOREIGN PATENT DOCUMENTS

| | | |
|---|---|---|
| EP | 0 657 769 A1 | 6/1995 |
| JP | 3-243932 A | 10/1991 |
| JP | 5-313153 A | 11/1993 |
| JP | 9-258007 A | 10/1997 |
| JP | 10-39769 | 2/1998 |
| JP | 10-123623 | 5/1998 |
| JP | 10-239503 | 9/1998 |
| JP | 11-101902 | 4/1999 |
| JP | 11-295504 A | 10/1999 |
| WO | WO 94/29768 A1 | 12/1994 |
| WO | WO 95/34832 A1 | 12/1995 |
| WO | WO 97/27606 A1 | 7/1997 |

OTHER PUBLICATIONS

"Notification of Transmittal of The International Search Report and the Written Opinion of the International Searching Authority, or the Declaration", "International Search Report" and "Written Opinion of the International Searching Authority", PCT/US04/17399, Mar. 1, 2005.

"Notification of Transmittal of The International Search Report and the Written Opinion of the International Searching Authority, or the Declaration", "International Search Report" and "Written Opinion of the International Searching Authority", PCT/US04/17450, Mar. 21, 2005.

European Search Report, EP 96 30 9443, Apr. 21, 1997.

Gambogi et al., *Advances and Applications of DuPont Holographic Photopolymers*, Proceedings of SPIE, vol. 2043, 1993, pp. 2-13.

Gambogi et al., *Color Holography Using DuPont Holographic Recording Films*, Proceedings of SPIE, vol. 2405, 1995, pp. 62-73.

Gambogi et al., *Diffractive Printing Methods Using Volume Holograms*, Proceedings of SPIE, vol. 1914, 1993, pp. 145-154.

Gambogi et al., *HOE Imaging in DuPont Holographic Photopolymers*, Proceedings of SPIE, vol. 2152, 1994, pp. 282-293.

Gambogi et al., *Holographic Transmission Elements Using Improved Photopolymer Films*, Proceedings of SPIE, vol. 1555, 1991, pp. 256-267.

Joubert et al., *Dispersive Holographic Microlens Matrix for Single LCD Projection*, Proceedings of SPIE, vol. 2650, 1996, pp. 243-252.

Parfenov et al., *Advances Optical Schemes With Liquid Crystal Image Converters for Display Applications*, Proceedings of SPIE, vol. 2650, 1996, pp. 173-179.

Popovic et al., *Technique for Monolithic Fabrication of Microlens Arrays*, Applied Optics, vol. 27, No. 7, Apr. 1, 1998, pp. 1281-1284.

Tipton et al., *Improved Process of Reflection Holography Replication and Heat Processing*, Proceedings of SPIE, vol. 2176, 1994, pp. 172-183.

Weber et al., *Hologram Recording in DuPont's New Photopolymer Materials*, Proceedings of SPIE, vol. 1212, 1990, pp. 30-39.

"Notification of Transmittal of The International Search Report and the Written Opinion of the International Searching Authority, or the Declaration", "International Search Report" and "Written Opinion of the International Searching Authority", PCT/US04/17449, Dec. 29, 2004.

* cited by examiner

MICRO-LENS ARRAY WITH PRECISELY ALIGNED APERTURE MASK AND METHODS OF PRODUCING SAME

This Application is a Continuation-in-part of application Ser. No. 10/120,785 filed Apr. 12, 2002, now U.S. Pat. No. 6,788,460 which is a Continuation-in-part of U.S. application Ser. No. 09/521,236, filed Apr. 5, 2000, now U.S. Pat. No. 6,483,612, which is a Continuation of U.S. application Ser. No. 09/060,906, filed Apr. 15, 1998, now abandoned. The entire disclosures of the prior applications are incorporated herein by reference.

BACKGROUND OF THE INVENTION

1. Field of the Invention

The present invention relates to lenses, and particularly relates to micro-lens arrays.

2. Background of the Related Art

Micro-lens arrays have found increasing application in a wide variety of fields, from ophthalmology through displays. Individual lenses, or lenslets, in the arrays can have sizes ranging from 1 $\mu$m to 10 mm in diameter.

In many applications, it is desirable to produce micro-lens arrays in which a mask or field stop is aligned with the lenses. The mask may include a plurality of apertures that are aligned with the individual lenses in the array. The purpose of such a mask may include reducing crosstalk or interference between the images created by each lenslet, or modifying or improving the optical characteristics and performance of the lenslets by altering the affective aperture. Masks can also be useful in reducing reflected light and improving the contrast of the images created by the array.

Given the potentially large number of lenses in micro-lens array, and the micron-scale size of the lenses in some applications, it is very difficult to effectively and precisely align the pattern of apertures in the mask with the exit pupils of the lenses. Currently available techniques include registration of the mask with the lens array using fiducials or similar methods borrowed from semiconductor mask or printing technology. These techniques are difficult to employ accurately over large areas and are time-consuming and expensive.

Alternative methods involve applying mask material to the lens array using an adhesive cured by exposure to ultraviolet light.

SUMMARY OF THE INVENTION

An object of the invention is to solve at least the above problems and/or disadvantages and to provide at least the advantages described hereinafter.

Another object of the invention is to provide a lenslet of a micro-lens array with an aligned aperture.

Another object of the invention is to provide a plurality of lenslets with a plurality of aligned apertures, the plurality of lenslets forming a micro-lens array.

Another object of the invention is to provide a micro-lens array with a mask including aligned apertures attached thereto.

Another object of the invention is to provide a micro-lens array on a first substrate, and a mask having apertures on a second substrate that is attached to the first substrate, with the apertures aligned with corresponding lenslets in the micro-lens array.

Another object of the invention is to provide a method of manufacturing a lenslet of a micro-lens array with an aligned aperture.

Another object of the invention is to provide a method of manufacturing a micro-lens array on a first substrate, and a mask having apertures on a second substrate that is attached to the first substrate, with the apertures aligned with corresponding lenslets in the micro-lens array.

Another object of the invention is to provide a method of manufacturing a micro-lens array with a mask including aligned apertures attached thereto.

To achieve these and other objects, a method of fabricating a lens with an aligned aperture is provided, comprising attaching a mask material to a lens, and projecting electromagnetic radiation onto the mask material with the lens, wherein the intensity of the electromagnetic radiation and the mask material are chosen so that an aperture is formed in the mask material by the electromagnetic radiation via a non-ablative process.

To further achieve these and other objects, there is further provided method of fabricating a micro-lens array with an aligned aperture mask, comprising providing a first substrate, forming a micro-lens array on a first surface of the first substrate, wherein the micro-lens array comprises a plurality of lenslets, applying a mask material to a second surface of the first substrate, and projecting electromagnetic radiation onto the mask material with each lenslet, wherein the intensity of the electromagnetic radiation and the mask material are chosen so that apertures are formed in the mask material by the electromagnetic radiation via a non-ablative process.

To further achieve these and other objects, there is further provided a method of fabricating a micro-lens array with an aligned aperture mask, comprising providing a first substrate, forming a micro-lens array on a first surface of the first substrate, wherein the micro-lens array comprises a plurality of lenslets, applying a mask material to a first surface of a second substrate, attaching a second surface of the first substrate with the first surface of the second substrate, and projecting electromagnetic radiation onto the mask material with each lenslet, wherein the intensity of the electromagnetic radiation and the mask material are chosen so that apertures are formed in the mask material by the electromagnetic radiation via a non-ablative process.

To further achieve these and other objects, there is further provided an optical system, comprising a micro-lens array comprising a plurality of lenslets and an aperture mask in optical communication with the micro-lens array, wherein the aperture mask comprises a plurality of apertures aligned with respective lenslets of the micro-lens array that are formed with a non-ablative process.

To further achieve these and other objects, there is further provided an optical system, comprising a lens and an aperture mask in optical communication with the lens, wherein the aperture mask comprises an aperture aligned with the lens, that is formed with a non-ablative process.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
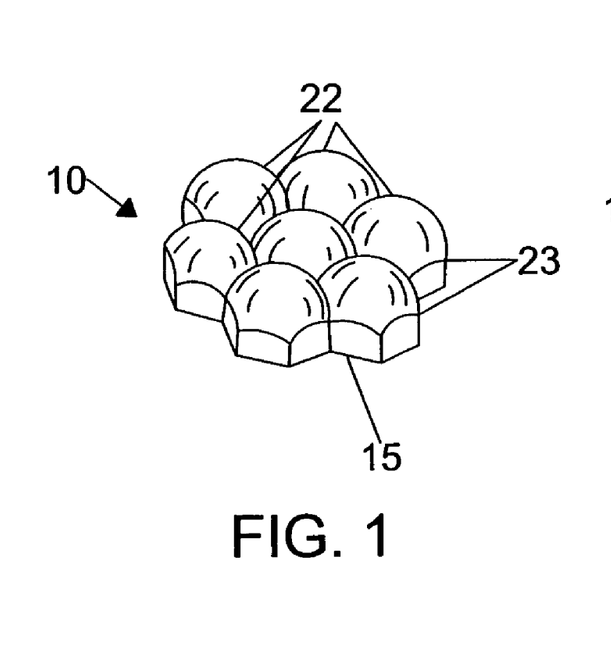
FIG. 1 is a perspective view of lenslets in a micro-lens array.

Referring to FIG. 1, a micro-lens array 10 made up of an assembly of lenslets 22 is shown. The lenslets 22 may be formed by "stamping" or embossing lens material 15. "Stamping", as used herein, broadly covers the process of forming shapes on a photopolymer, and curing the photopolymer material, and "stamper" broadly covers any tool used to form such shapes.

The lenslets 22 shown in FIG. 1 are convex-shaped, however, other shapes and configurations may also be used. In the example shown in FIG. 1, each of the lenslets 22 has a spherical sector or a like-rounded projecting portion, and a periphery 23. However, the projecting portion of the lenslets may be of any shape, including ellipsoidal, toroidal or aspherical. Each lenslet 22 may be hexagonal in shape at its periphery 23, or other shapes besides hexagonal could be used for the periphery 23 of each lenslet. The periphery 23 defines the lenslets 22 as being only partially spherical or partially rounded surfaces. For example, lenslets 22 may form hemispheres. Lenslets 22 may be spaced at periodic or random intervals across the surface of the substrate 12.

Referring to FIGS. 2A–2D a micro-lens array 10 with an aligned aperture mask 16 is shown in accordance with one preferred embodiment of the present invention. In one preferred embodiment, the micro-lens array 10 includes lenslets 22 that are formed on or attached to a substrate 12, which has first and second surfaces, 24 and 26, respectively. Although the lenslets 22 and the substrate 12 are shown as separate elements, it should be appreciated that the substrate 12 could be the lens material 15 from which the lens array 10 is formed, as shown in the lens array 10 of FIG. 1.

Figure 2A:
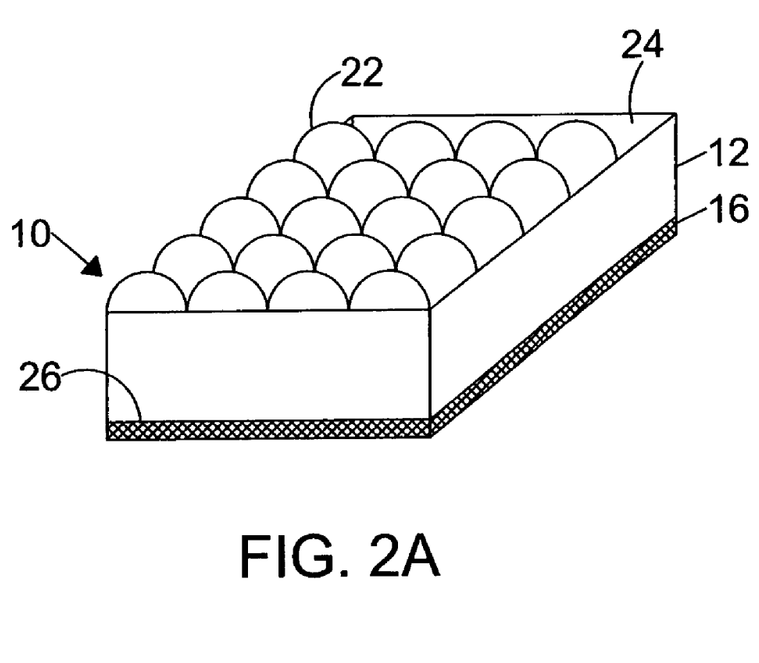
FIG. 2A is a perspective view of a micro-lens array with an aligned aperture mask, in accordance with one preferred embodiment of the present invention.

Possible spacing patterns of the lenslets 22 include having at least some of the lenslets 22 abutting one another, separating at least some of the lenslets 22 by a prescribed distance, and/or having at least some of the lenslets 22 overlap each other. The lenslets 22 can each have similar focal lengths, or their focal lengths can vary from one another in a prescribed manner.

The configuration of each of the lenslets 22 may include virtually any lens geometry known in the art which may be attached to or formed on the surface of the planar substrate 12. Although not required, the first and second surfaces, 24 and 26, of the substrate 12 are typically parallel to one another. The overall form of the planar substrate 12 may be disk-like or sheet-like, although virtually any geometric form can be used. The planar substrate 12 is typically made of glass or plastic, although any transparent material suitable for micro-lens structures known in the art may be employed.

Figure 2B:
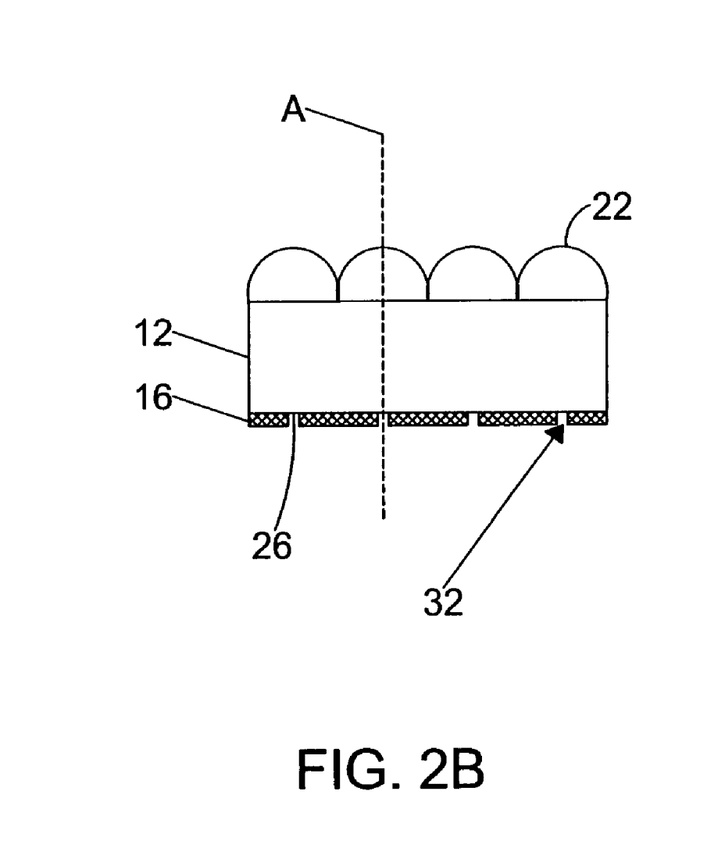
FIG. 2B is a cross-sectional view of the micro-lens array with aligned aperture mask embodiment of FIG. 2A, in accordance with the present invention.

As shown in FIG. 2B, each lenslet 22 will typically have an optical axis A, and the optical axis will typically be orthogonal to a planar surface of the substrate 12. Although the typical micro-lens array 10 is generally configured so that the optical axes A of all the lenslets 22 are parallel to one another, this need not be the case. Other configurations are possible, depending on the application.

Attached onto or positioned adjacent to a second surface 26 of the substrate 12 is an aperture mask 16. The aperture mask 16 is preferably formed from a material that is compatible with a non-ablative aperture formation process, as will be explained in more detail below. Preferred mask 16 materials include carbides, such as TiC, metals (e.g., Al, Cr, Cu, Zn, Se, Fe) alone or in combination with their oxides, high temperature metals (e.g., Ti, Ta, Zr, V), nitrides, oxides, selenides, tellurides, and carbon. Cermets and mixtures of these materials may also be used. Preferred mask 16 materials may also include polymers, organic black materials, and other substances substantially opaque to the electromagnetic radiation to be transmitted by the micro-lens array 10. Typical thicknesses of the mask 16 are on the order of 0.5 to 100 absorption lengths, depending on the desired optical properties, although other thicknesses may be used.

The aperture mask 16 includes a plurality of apertures 32. The aperture mask 16 preferably has one aperture 32 for each lenslet 22 in the micro-lens array 10, with each aperture 32 precisely aligned with its respective lenslet 22 so that light input to a lenslet 22 is focused through its corresponding aperture 32.

Figure 2C:
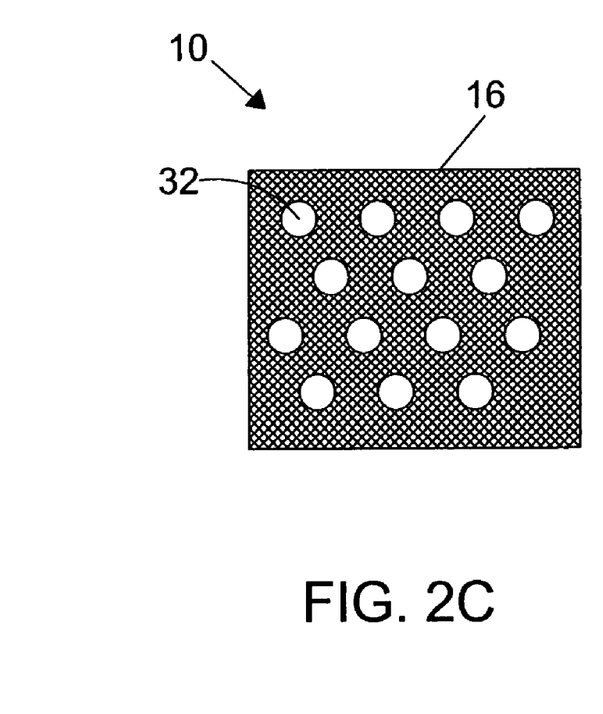
FIG. 2C is a plan view of the aperture mask used in the embodiment of FIGS. 2A and 2B, in accordance with the present invention.
Figure 2D:
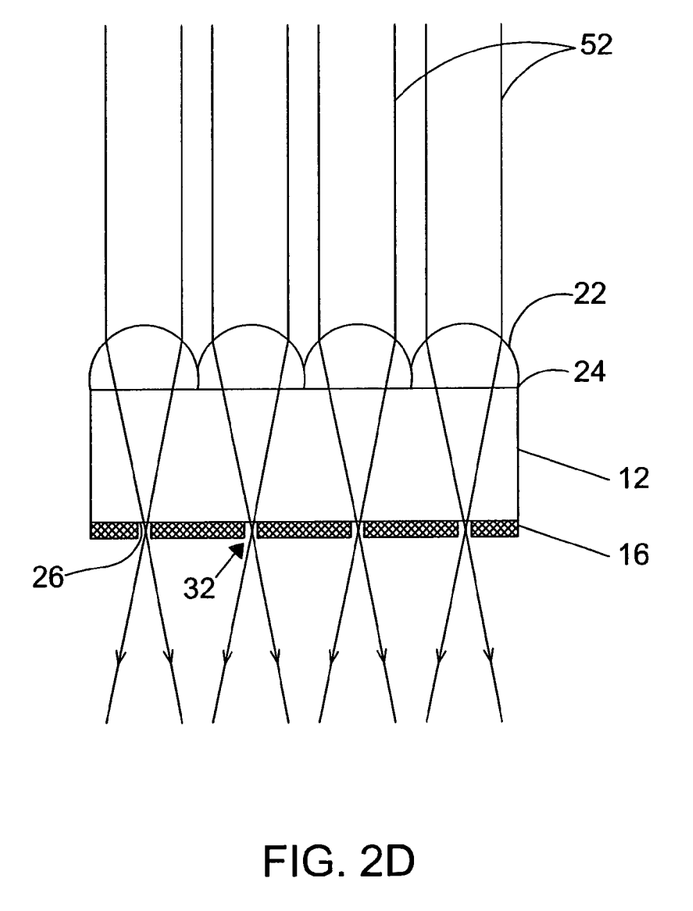
FIG. 2D is a cross-sectional view of the micro-lens array with aligned aperture mask embodiment of FIGS. 2A–2C, showing how light propagates through the micro-lens array/aperture mask combination, in accordance with the present invention.

FIG. 2C is a plan view of the aperture mask 16, showing the spaced apertures 32 in the aperture mask 16. Referring to FIG. 2D, a micro-lens array 10 with an aligned aperture mask 16 is shown with light 52 projected therethrough. As shown in FIG. 2D, when light 52 is directed through a lenslet 22, the lenslet 22 focuses and directs the light 52 so that at least a portion of it propagates through the aperture 32. Thus, after the light 52 is refracted by a lenslet 22, the light 52 may be further affected by the corresponding aperture 32. Consequently, after passing through the lenslet 22, the light 52 can be further modified by the aperture 32. Such modifications include blocking a portion of the light 52, as well as reducing cross-talk between light 52 input to multiple lenslets 22.

Figure 2E:
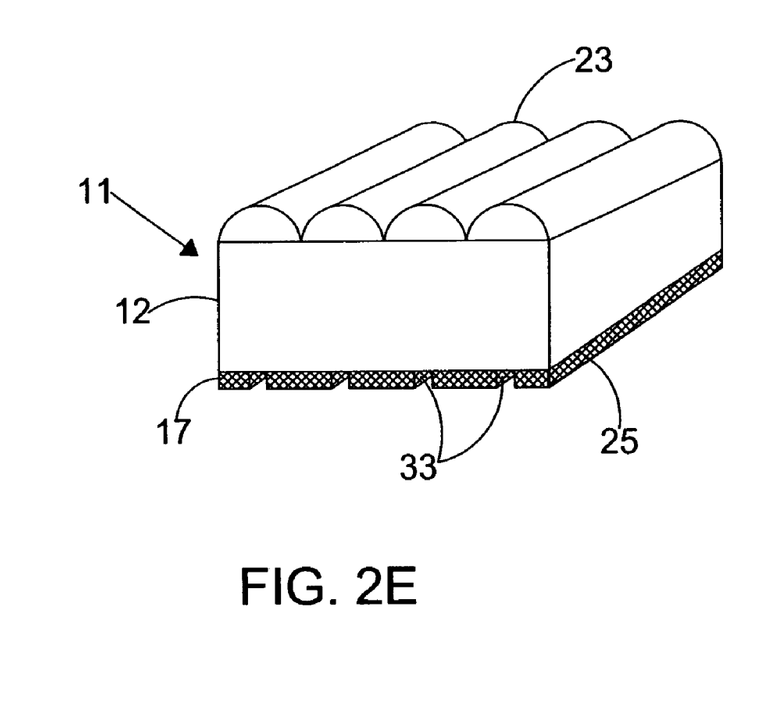
FIG. 2E is a perspective view of a micro-lens array with an aligned aperture mask, in accordance with the present invention.

It should be noted that lenses of virtually any geometry may be used with the aperture mask. For example, referring to FIGS. 2E and 2F, a lenticular micro-lens array 11 is shown. The lenticular micro-lens array 11 includes a substrate 12 with a top surface 24 and a bottom surface 25. Attached to the top surface 24 are lenticular lenslets 23 consisting of linear lens structures. The bottom surface 25 of the substrate 12 has an aperture mask 17. The aperture mask 17 has apertures 33 which are aligned with each corresponding lenslet 23.

Figure 2F:
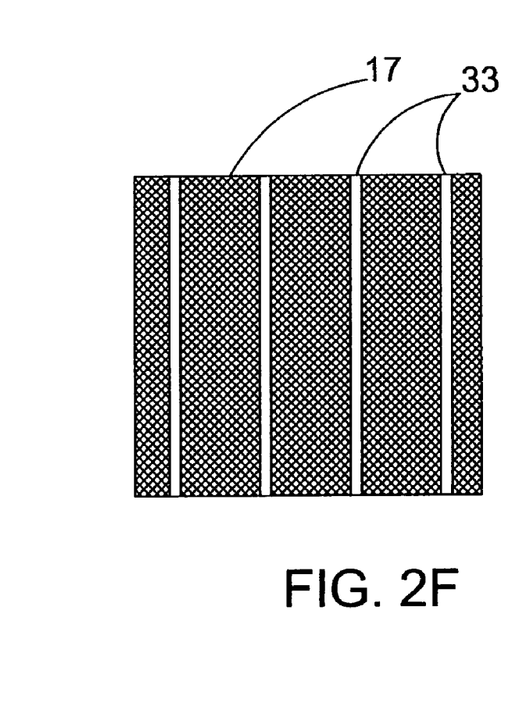
FIG. 2F is a plan view of the aperture mask used in the embodiment of FIG. 2E, in accordance with the present invention.

Referring to FIG. 2F, a plan view of the mask side of the lenticular lens array is shown. The lenticular lens array includes the mask 17 with the apertures 33. As can be seen in FIG. 2F, the apertures 33 of the lenticular lens array includes substantially linear openings in the mask 17. The apertures 33 run along the substrate 12 substantially in alignment with each corresponding lenslet 23.

Figure 3A:
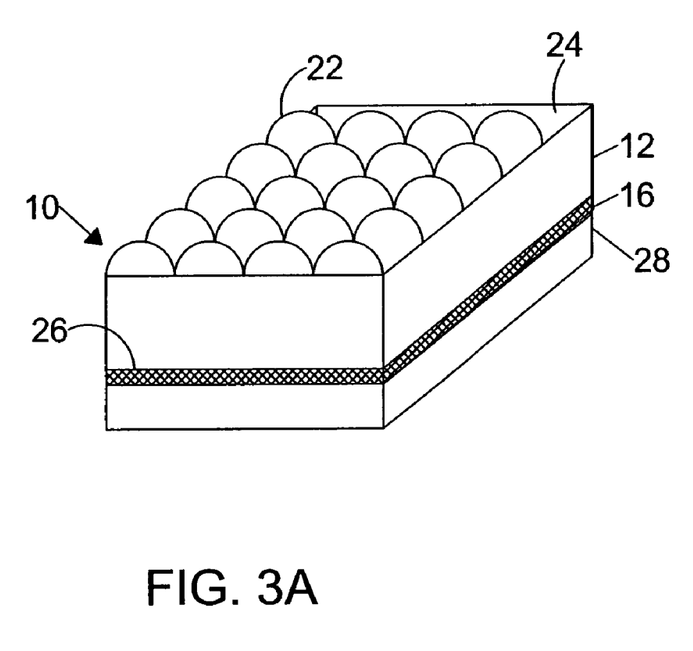
FIG. 3A is a perspective view of a micro-lens array with an aligned aperture mask, in accordance with a second preferred embodiment of the present invention.
Figure 3B:
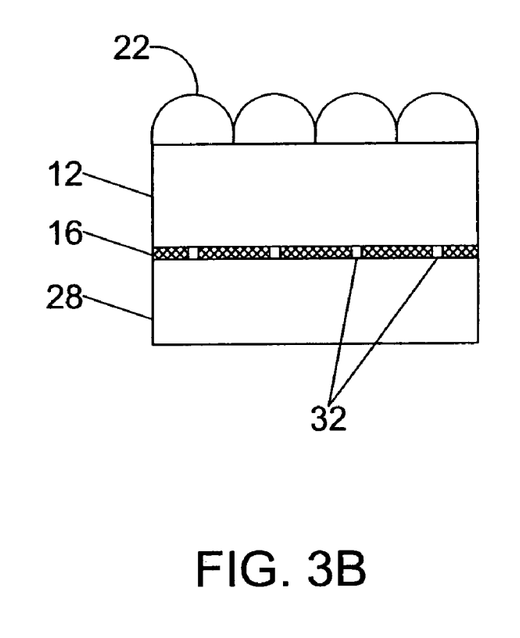
FIG. 3B is a cross-sectional view of the micro-lens array with aligned aperture mask embodiment of FIG. 3A, in accordance with the present invention.

FIGS. 3A and 3B illustrate a second preferred embodiment of the invention is shown. The embodiment of FIGS. 3A and 3B is similar to the embodiment of FIGS. 2A–2D, with the addition of a substrate 28 that is attached to the aperture mask 16. While preferably transparent to the electromagnetic radiation that will be input to the micro-lens array 10, the substrate 28 may also be reflective, partially reflective or diffusive to the electromagnetic radiation that will be input to the micro-lens array 10. Thus, the substrate 28 may provide mechanical support to the micro-lens array 10, protect the aperture mask 16 and/or filter, polarize or otherwise modify light projected by the lenslets 22 through the apertures 32.

FIGS. 4A–4D are cross-sectional views of steps in one preferred method of fabricating the micro-lens array/aperture mask of the present invention. For illustrative purposes, cross-sectional views showing the formation of two lenslets and corresponding apertures are shown. An initial step of the method is forming the micro-lens array (FIG. 4A), which includes providing a substrate 12 made of, for example, a polycarbonate or acrylic plastic thick enough to provide a desired level of mechanical stability. A material from which the micro-lens array is to be replicated on a surface 24 of the transparent substrate 12 is then applied to the substrate 12 (not shown). This material may be, for example, a photopolymer epoxy, a polycarbonate, or PMMA resin. This material is then patterned to form the individual lenses 22 in the micro-lens array. This patterning step may be performed by any one of a variety of methods. The patterning step may be performed in accordance with a stamping operation performed by a master, which contains the lens pattern thereon. The patterning step may also be performed by embossing or other techniques.

A second step (FIG. 4B) includes coating a second surface 16 of the substrate 12 with a thin layer 16 of masking material. The thickness of this layer may vary with the material employed, but a thickness of from 0.5 to 100 absorption lengths has been found to be preferable. Coating techniques include e-beam vacuum deposition, sputtering, chemical vapor deposition, as well as other film-deposition techniques. As discussed above, preferred masking materials include carbides, such as TiC, metals (e.g., Al, Cr, Cu, Zn, Se, Fe) alone or in combination with their oxides, high temperature metals (e.g., Ti, Ta, Zr, V), nitrides, oxides, selenides, tellurides, and carbon. Cermets and mixtures of these materials may also be used. Preferred masking materials may also include polymers, organic black materials, and other substances substantially opaque to the electromagnetic radiation to be transmitted by the micro-lens array 10. Essentially, any substance substantially opaque to the electromagnetic radiation to be transmitted by the micro-lens array and that is compatible with a non-ablative aperture formation process may be used.

A third step (FIG. 4C) includes forming apertures 32 in mask layer 16 which are aligned with respective lenslets 22. This is preferably performed by directing pulsed laser radiation or similarly intense electromagnetic radiation 62 through the curved surface of each lenslet 22, which focuses the radiation 62 to an area 42 on the mask layer 16. The electromagnetic radiation 62 is preferably pulsed with energy sufficient to form an aperture by means of a non-ablative process, but preferably not so much energy so as to vaporize the material or degrade the desired optical properties of the lenslets 22 and/or the associated substrates.

Figure 4A:
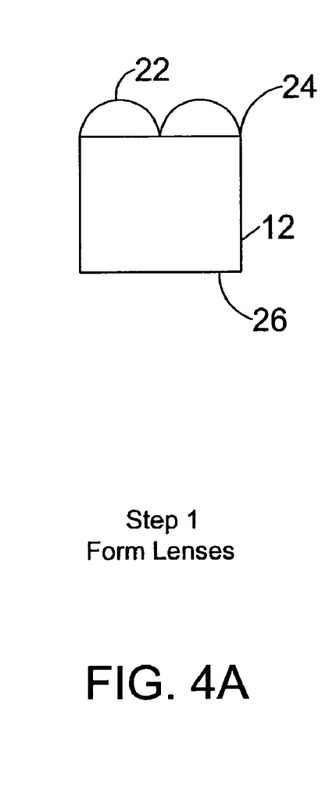
FIGS. 4A–4D are cross-sectional views of steps in one preferred method of fabricating a micro-lens array/aperture mask, in accordance with the present invention.
Figures 4B, 4C, 4D:
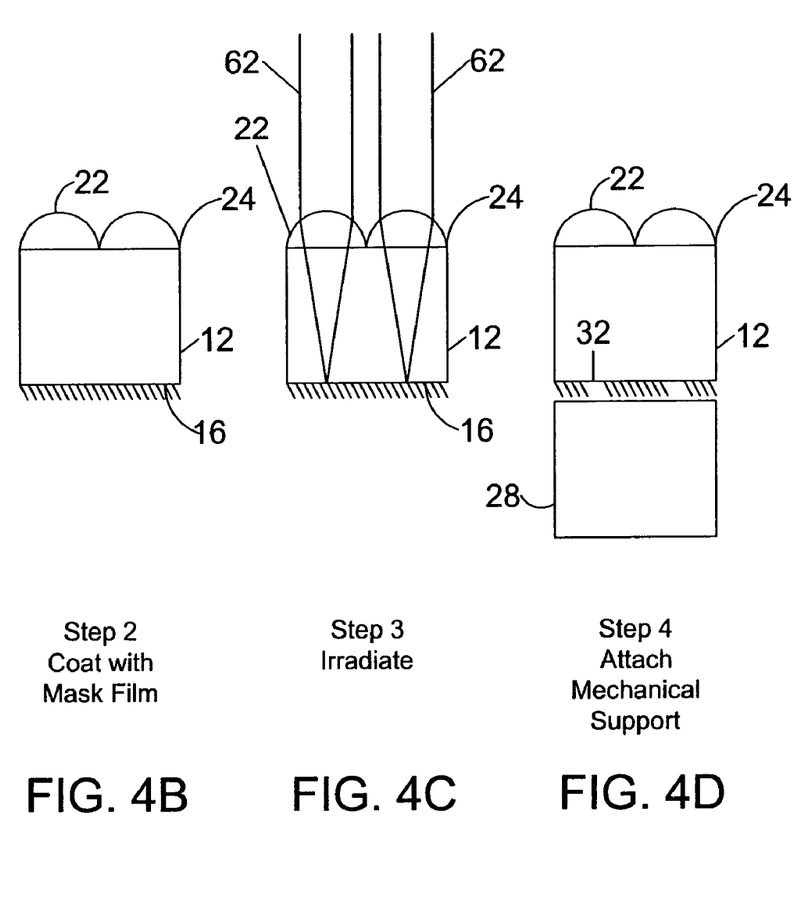

A typical range for pulses would include irradiance levels above 0.1 mJ/cm$^2$ and pulse widths shorter than 1 ms, however, the precise combination of irradiance and pulse widths required will depend on many parameters, including the type of material used for the mask layer 16 the thickness of the mask layer and the precise positioning of the aperture. For example, for a mask layer 16 made of TiC material with a thickness in the range of 0.5 to 100 absorption lengths, a combination of pulses with irradiances of 1 mJ/cm$^2$ to 5 mJ/cm$^2$ and pulse widths on the order of 10 ns have proven effective. Additionally, the optimum wavelengths of the electromagnetic radiation 62 used will depend on the spectral absorption properties of the material used for the mask layer 16. For a mask layer 16 made of TiC, a wide range of wavelengths, from infrared through ultraviolet have proven effective.

The apertures 32 may be formed one at a time by serially illuminating each lenslet 22 in the micro-lens array with the pulsed laser radiation, or other electromagnetic radiation. Alternatively, they may also be formed by simultaneously illuminating two or more of the lenslets 22, using either separate electromagnetic beams (e.g., separate pulsed laser beams) or a single electromagnetic beam (e.g., a single pulsed laser beam) that has been spatially expanded to cover two or more of the lenslets 22.

Because the lenslet 22 focuses the laser radiation 62 onto the mask layer 16, the thickness of the substrate 12 can determine whether the mask layer 16 lies at the focal point of the lenslet 22. By using a substrate 12 of a different thickness, the size of the irradiated area 42, and therefore the size of the aperture, may be changed. The smallest aperture 32 that can be formed by the lenslet is achieved by adjusting the thickness of the substrate 12 so that the mask layer 16 lies at the focal plane of the lenslet 22. In this case, the aperture size is dictated by the diffraction limited spot size of the radiation at the focal plane and any aberrations that may be present.

The term "non-ablative process" is used to describe a process in which apertures are patterned in a mask layer by depositing sufficient electromagnetic energy at desired points on the mask layer so that at least one of the following mechanisms takes place: (1) a "contraction" mechanism in which the mask layer material heats up and contracts to form an aperture without vaporizing or ablating the mask layer material; (2) a "phase change" mechanism in which the mask layer material undergoes a phase change into a form which is substantially transparent to radiation at desired predetermined wavelengths; (3) a "mechanical deformation" mechanism in which the mask layer material undergoes mechanical deformation; and/or (4) a "chemical" mechanism in which the mask layer material undergoes a chemical transformation, such as oxidation.

With the "contraction" mechanism, the mask layer material is preferably heated to a point in which the surface tension of the mask layer material overcomes the strength of the mask layer material. This results in the mask layer material "pulling back" or contracting to form a clear aperture, with rolled back material at the perimeter of the aperture. Depending on the mask layer material, it may not be necessary to heat the mask layer area where the aperture is to be formed to the melting point of the mask layer material.

With respect to "mechanical deformation" mechanism, localized heating causes a localized piston effect, in which the mask layer material essentially explosively expands, resulting in an aperture being formed. Mask layer material from the center of the aperture formation area is either blown clear off the substrate or off to the side.

The non-ablative process used in the present invention exhibits many benefits over traditional ablative processes. If an ablative process were to be used to create the apertures, the mask layer material would have to be heated to the material's boiling temperature. In order to achieve these high temperatures, a very high power laser with very short laser pulses would have to be used. Lasers that produce pulse widths of less than 1 ns, and typically pico-second pulses, are needed for ablative processes. These types of lasers are expensive, difficult to work with, and have limited wavelength ranges.

Because ablative processes require the mask layer material to be raised to the boiling point, mask layer materials with relatively low boiling temperatures would need to be used in order to avoid heating the surrounding areas (e.g., the substrate and lenslets) to the point where these areas would be damaged. This would effectively limit the choice of materials for the mask layer.

In contrast, the non-ablative process used in the present invention does not require that the mask layer material be heated to the material's boiling point. Accordingly, a much wider selection of materials can be used in the present invention, including many high temperature materials, as listed above. In addition, a wider selection of radiation sources may be used with the non-ablative process used in the present invention.

An optional fifth step (FIG. 4D) includes attaching a substrate 28 of polycarbonate or other material to the mask layer 16 preferably with an optical adhesive. The substrate 28 may be optically active and/or may merely serve to protect the mask layer 16 and provide additional mechanical support to the micro-lens array.

FIGS. 5A–5E are cross-sectional views of steps in a second preferred method of fabricating the micro-lens array/aperture mask of the present invention. An initial step of the method (FIG. 5A), a substrate is provided that is made of, for example, polycarbonate or acrylic plastic thick enough to provide a desired level of mechanical stability. The substrate 28 is preferably optically transparent to the electromagnetic radiation that will be input to the completed micro-lens array.

A second step (FIG. 5B) includes applying a mask layer 16 to the substrate 28 using techniques similar to those discussed above in connection with the method of FIGS. 4A–4D.

A third step (FIG. 5C) involves forming the micro-lens array, which includes providing a substrate 12 made of, for example, a polycarbonate or acrylic plastic thick enough to provide a desired level of mechanical stability. The substrate 12 is preferably attached to the mask layer 16 with an optical adhesive.

Figure 5A:
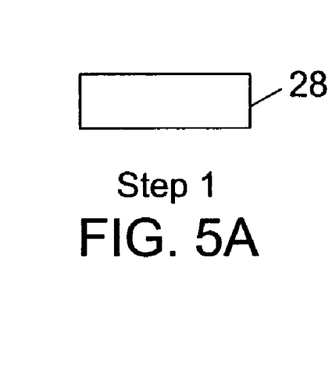
FIGS. 5A–5E are cross-sectional views of steps in another preferred method of fabricating a micro-lens array/aperture mask, in accordance with the present invention.
Figure 5B:
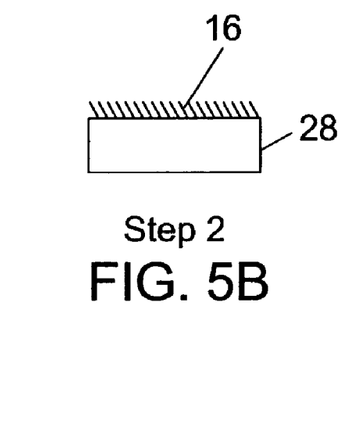
Figure 5C:
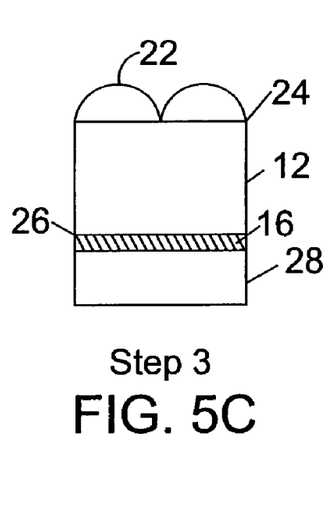

A material from which the micro-lens array is to be replicated on a surface 24 of the transparent substrate 12 is then applied to the substrate 12 (not shown). This material may be, for example, a photopolymer epoxy, a polycarbonate, or PMMA resin. This material is then patterned to form the individual lenses 22 in the micro-lens array. This patterning step may be performed by any one of a variety of methods. Preferably, the patterning step is performed in accordance with a stamping operation performed by a master, which contains the lens pattern thereon.

A fourth step (FIGS. 5D and 5E) includes forming apertures 32 in mask layer 16 which are aligned with respective lenslets 22. As discussed above, this is preferably performed by directing pulsed laser radiation or similarly intense electromagnetic radiation 62 through the curved surface of each lenslet 22, which focuses the radiation 62 to an area 42 on the mask layer 16. The electromagnetic radiation 62 is preferably pulsed with energy sufficient to form an aperture by means of a non-ablative process, but preferably not so much energy as to vaporize the material or degrade the desired optical properties of the lenslets 22 and/or the associated substrates.

Figure 5D:
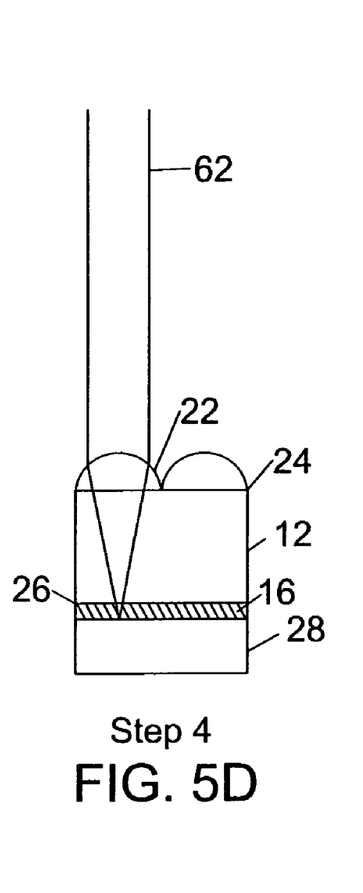
Figure 5E:
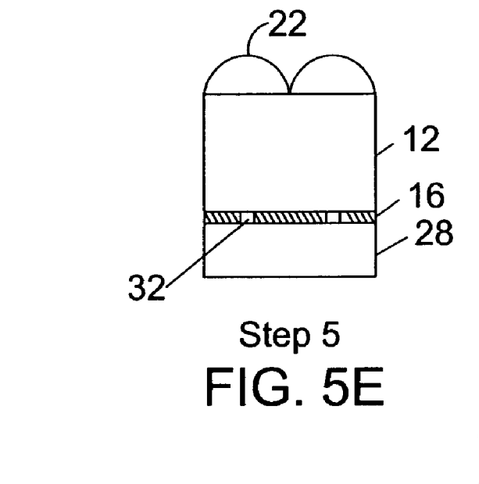

As discussed above, a typical range for pulses would include irradiance levels above 0.1 $mJ/cm^2$ and pulse widths shorter than 1 ms, however, the precise combination of irradiance and pulse widths required will depend on many parameters, including the type of material used for the mask layer 16 the thickness of the mask layer and the precise positioning of the aperture. For example, for a mask layer 16 made of TiC material with a thickness in the range of 0.5 to 100 absorption lengths, a combination of pulses with irradiances of 1 $mJ/cm^2$ to 5 $mJ/cm^2$ and pulse widths on the order of 10 ns have proven effective. Additionally, the optimum wavelengths of the electromagnetic radiation 62 used will depend on the spectral absorption properties of the material used for the mask layer 16. For a mask layer 16 made of TiC, a wide range of wavelengths, from infrared through ultraviolet have proven effective.

The apertures 32 may be formed one at a time by serially illuminating each lenslet 22 in the micro-lens array with the pulsed laser radiation, or other electromagnetic radiation. Alternatively, they may also be formed by simultaneously illuminating two or more of the lenslets 22, using either separate electromagnetic beams (e.g., separate pulsed laser beams) or a single electromagnetic beam (e.g., a single pulsed laser beam) that has been spatially expanded to cover two or more of the lenslets 22.

Because the lenslet 22 focuses the laser radiation 62 onto the mask layer 16, the thickness of the substrate 12 can determine whether the mask layer 16 lies at the focal plane of the lenslet 22. By using a substrate 12 of a different thickness, the size of the irradiated area 42, and therefore the size of the aperture, may be changed. The smallest aperture 32 that can be formed by the lenslet is achieved by adjusting the thickness of the substrate 12 so that the mask layer 16 lies at the focal plane of the lenslet 22. In this case, the aperture size is dictated by the diffraction limited spot size of the radiation at the focal plane.

As discussed above, the term "non-ablative process" is used herein to describe a process in which apertures are formed or patterned in the mask layer, preferably without vaporizing or ablating the mask layer material. Use of such a process is of particular importance in the fabrication method of FIGS. 5A–5E, since the mask layer 16 is positioned between other layers of material (e.g., the two substrates 12 and 28). An ablative process is particularly inappropriate for this embodiment.

Figure 6:
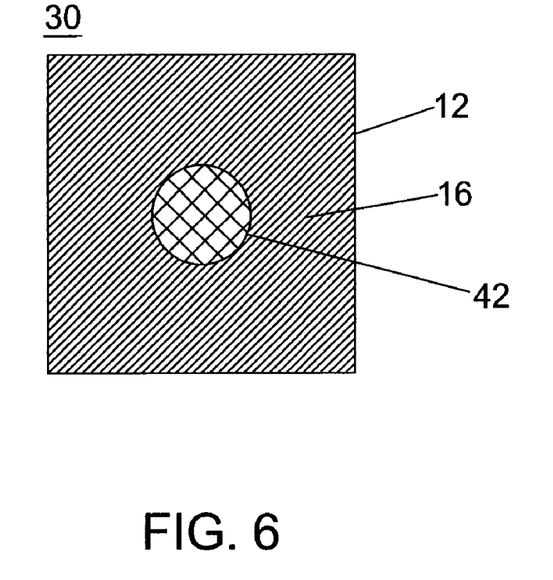
FIG. 6 is a plan view of a mask portion corresponding to a single lenslet section of a micro-lens array before an aperture is formed, in accordance with the present invention.
Figure 7:
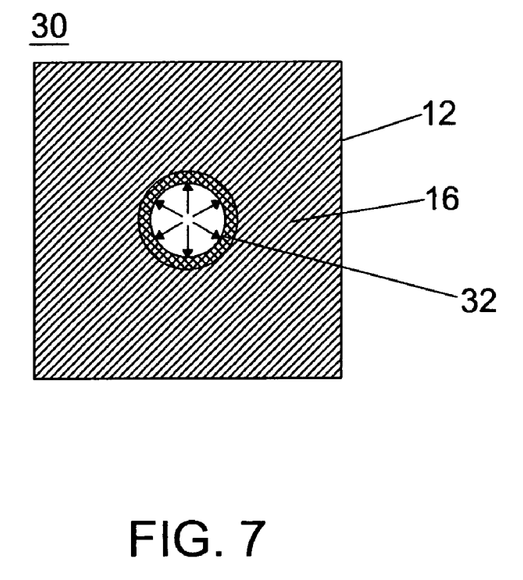
FIG. 7 is a plan view of a mask portion corresponding to a single lenslet section of a micro-lens array after an aperture is formed, in accordance with the present invention.

This non-ablative aperture formation process is illustrated in FIGS. 5 and 6, which are plan views of a mask portion corresponding to a single lenslet section of a micro-lens array before and after an aperture is formed, respectively.

As shown in FIG. 6, the electromagnetic radiation has been focused onto an area 42 on the mask layer 16. The energy delivered to the area 42 is controlled so as to initiate a non-ablative aperture formation process. In one embodiment of such a non-ablative process, an amount of electromagnetic energy is deposited at desired areas on the mask layer 16 sufficient to melt the mask layer material and cause it to contract to form an aperture 32, as shown in FIG. 7. The shape of the aperture 32 will depend on the spatial profile of that portion of the electromagnetic radiation that deposits the required amount of energy on the mask layer 16. Although the aperture 32 shown in FIG. 7 is generally circular in shape, any other aperture shape can be produced while still falling within the scope of the present invention, including, but not limited to, square, rectangular, polygonal and elliptical shapes.

Other modifications and variations to the invention will be apparent to those skilled in the art from the foregoing disclosure. Thus, while only certain embodiments of the invention have been specifically described herein, it will be apparent that numerous modifications may be made thereto without departing from the spirit and scope of the invention.

What is claimed is:

1. A method of fabricating a lens with an aligned aperture, comprising:
    mechanically coupling a mask material to a lens; and
    projecting electromagnetic radiation onto the mask material with the lens;
    wherein the intensity of the electromagnetic radiation and the mask material are chosen so that an aperture is formed in the mask material by the electromagnetic radiation via a non-ablative process.

2. The method of claim 1, further comprising attaching a substrate to the mask material prior to projecting the electromagnetic radiation onto the mask material.

3. The method of claim 1, wherein mechanically coupling a mask material to a lens comprises:
    attaching a mask material to a substrate; and
    forming a lens on the mask material.

4. The meted of claim 1, wherein the mask material is opaque.

5. The method of claim 1, wherein the mask material comprises a metal.

6. The method of claim 5, wherein the mask material comprises Al, Cr, Cu, Zn, Se, Fe, Ti, Ta, Zr, and/or V.

7. The method of claim 1, wherein the mask material comprises a metallic carbide, nitrides, oxides, selenides, and/or tellurides.

8. The method of claim 7, wherein the mask material comprises TiC.

9. The method of claim 1, wherein the mask material comprises a metal oxide.

10. The method of claim 1, wherein the mask material comprises a cermet material.

11. The method of claim 1, wherein the mask material comprises a polymer.

12. The method of claim 1, wherein the mask material comprises an organic black material.

13. The method of claim 1, wherein the mask material has a thickness of between approximately 0.5 and 100 absorption lengths.

14. The method of claim 1, wherein the electromagnetic radiation comprises pulsed laser radiation.

15. The method of claim 14, wherein the pulsed laser radiation comprises near-infrared radiation.

16. The method of claim 14, wherein the pulsed laser radiation has an irradiance level between approximately 1 mJ/cm$^2$ approximately 5 mJ/cm$^2$.

17. The method of claim 16, wherein a pulse width of the pulsed laser radiation is approximately 10 ns.

18. The method of claim 1, wherein the non-ablative process comprises a thermal process that results in the mask material contracting away from an area irradiated by the electromagnetic radiation.

19. The method of claim 1, wherein the lens comprises a lenticular lens.

20. The method of claim 19, wherein the aperture has a length corresponding to a length of the lens.

21. The method of claim 1, wherein the lens has a spherical, ellipsoidal, toroidal, aspherical, or polyhedral shape.

22. The method of claim 1, wherein the mask material is positioned in proximity to an image plane of the lens.

23. The method of claim 1, wherein the non-ablative process forms the aperture via a contraction mechanism.

24. The method of claim 1, wherein the non-ablative process forms the aperture via a phase change mechanism.

25. The method of claim 1, wherein the non-ablative process forms the aperture via a mechanical deformation mechanism.

26. The method of claim 1, wherein the non-ablative process forms the aperture via a chemical mechanism.

27. A method of fabricating a micro-lens array with an aligned aperture mask, comprising:
    providing a first substrate;
    forming a micro-lens array on a first surface of the first substrate, wherein the micro-lens array comprises a plurality of lenslets;
    applying a mask material to a second surface of the first substrate; and
    projecting electromagnetic radiation onto the mask material with each lenslet;
    wherein the intensity of the electromagnetic radiation and the mask material are chosen so that apertures are formed in the mask material by the electromagnetic radiation via a non-ablative process.

28. The method of claim 27, further comprising attaching a second substrate to the mask material after the apertures are formed.

29. The method of claim 27, further comprising attaching a second substrate to the mask material before the apertures are formed.

30. The method of claim 27, wherein the mask material is opaque.

31. The method of claim 27, wherein the mask material comprises a metal.

32. The method of claim 31, wherein the mask material comprises Al, Cr, Cu, Zn, Se, Fe, Ti, Ta, Zr, and/or V.

33. The method of claim 27, wherein the mask material comprises a metallic carbide, nitrides, oxides, selenides, and/or tellurides.

34. The method of claim 33, wherein the mask material comprises TiC.

35. The method of claim 27, wherein the mask material comprises a metal oxide.

36. The method of claim 27, wherein the mask material comprises a cermet material.

37. The method of claim 27, wherein the mask material comprises a polymer.

38. The method of claim 27, wherein the mask material comprises an organic black material.

39. The method of claim 27, wherein the mask material has a thickness of between approximately 0.5 and 100 absorption lengths.

40. The method of claim 27, wherein the electromagnetic radiation comprises pulsed laser radiation.

41. The method of claim 40, wherein the pulsed laser radiation comprises near-infrared radiation.

42. The method of claim 40, wherein the pulsed laser radiation has an irradiance level between approximately 1 mJ/cm$^2$ to approximately 5 mJ/cm$^2$.

43. The method of claim 42, wherein a pulse width of the pulsed laser radiation is approximately 10 ns.

44. The method of claim 27, wherein the lenslets comprise lenticular lenslets.

45. The method of claim 44, comprising forming apertures with lengths corresponding to lengths of each corresponding lenticular lenslet.

46. The method of claim 27, wherein the lenslets have a spherical, ellipsoidal, toroidal, aspherical, or polyhedral shape.

47. The method of claim 27, wherein the mask material is positioned in proximity to an image plane of the lenslets.

48. The method of claim 27, wherein the non-ablative process forms the apertures via a contraction mechanism.

49. The method of claim 27, wherein the non-ablative process forms the apertures via a phase change mechanism.

50. The method of claim 27, wherein the non-ablative process forms the apertures via a mechanical deformation mechanism.

51. The method of claim 27, wherein the non-ablative process forms the apertures via a chemical mechanism.

52. A method of fabricating a micro-lens array with an aligned aperture mask, comprising:
   applying a mask material to a first surface of a first substrate;
   forming a micro-lens may on the mask material, wherein the micro-lens may comprises a plurality of lenslets; and
   projecting electromagnetic radiation onto the mask material with each lenslet;
   wherein the intensity of the electromagnetic radiation and the mask material are chosen so that apertures are formed in the mask material by the electromagnetic radiation via a non-ablative process.

53. The method of claim 52, wherein forming a micro-lens array on the mask material comprises: attaching a second substrate to the mask material;
   and forming a micro-lens array on the second substrate.

54. The method of claim 52, wherein the mask material is opaque.

55. The method of claim 52, wherein the mask material comprises a metal.

56. The method of claim 55, wherein the mask material comprises Al, Cr, Cu, Zn, Se, F; Ti, Ta, Zr, and/or V.

57. The method of claim 52, wherein the mask material comprises a metallic carbide, nitrides, oxides, selenides, and/or tellurides.

58. The method of claim 57, wherein the mask material comprises TiC.

59. The method of claim 52, wherein the mask material comprises a metal oxide.

60. The method of claim 52, wherein the mask material comprises a cermet material.

61. The method of claim 52, wherein the mask material comprises a polymer.

62. The method of claim 52, wherein the mask material comprises an organic black material.

63. The method of claim 52, wherein the mask material has a thickness of between approximately 0.5 and 100 absorption lengths.

64. The method of claim 52, wherein the electromagnetic radiation comprises pulsed laser radiation.

65. The method of claim 64, wherein the pulsed laser radiation comprises near-infrared radiation.

66. The method of claim 64, wherein the pulsed laser radiation has an irradiance level between approximately 1 mJ/cm$^2$ approximately 5 mJ/cm$^2$.

67. The method of claim 66, wherein a pulse width of the pulsed laser radiation is approximately 10 ns.

68. The method of claim 52, wherein the lenslets comprise lenticular lenslets.

69. The method of claim 68, wherein a length of each aperture is aligned with a length of each corresponding lenslet.

70. The method of claim 52, wherein the lenslets have a spherical, ellipsoidal, toroidal, aspherical, or polyhedral shape.

71. The method of claim 52, wherein the mask material is positioned in proximity to an image plane of the lenslets.

72. The method of claim 52, wherein the non-ablative process forms the apertures via a contraction mechanism.

73. The method of claim 52, wherein the non-ablative process forms the apertures via a phase change mechanism.

74. The method of claim 52, wherein the non-ablative process forms the apertures via a mechanical deformation mechanism.

75. The method of claim 52, wherein the non-ablative process forms the apertures via a chemical mechanism.

\* \* \* \* \*

UNITED STATES PATENT AND TRADEMARK OFFICE
CERTIFICATE OF CORRECTION

PATENT NO. : 6,967,779 B2 Page 1 of 1
APPLICATION NO. : 10/452238
DATED : November 22, 2005
INVENTOR(S) : Fadel et al.

It is certified that error appears in the above-identified patent and that said Letters Patent is hereby corrected as shown below:

Column 11, line 38 should read as follows:

forming a micro-lens array on the mask material, wherein

Column 11, line 39 should read as follows:

the micro-lens array comprises a plurality of lenslets

Signed and Sealed this

Fifteenth Day of August, 2006

JON W. DUDAS
*Director of the United States Patent and Trademark Office*